3 Sheets—Sheet 2.
C. E. BECKWITH.
Corn-Planter.
No. 217,046.  Patented July 1, 1879.
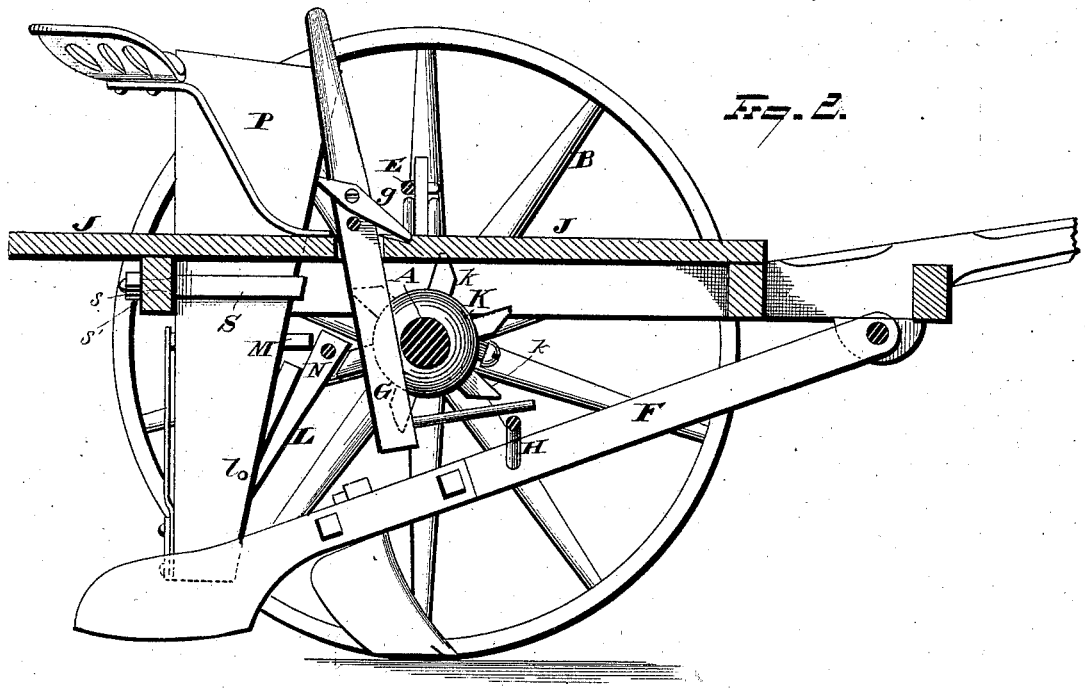
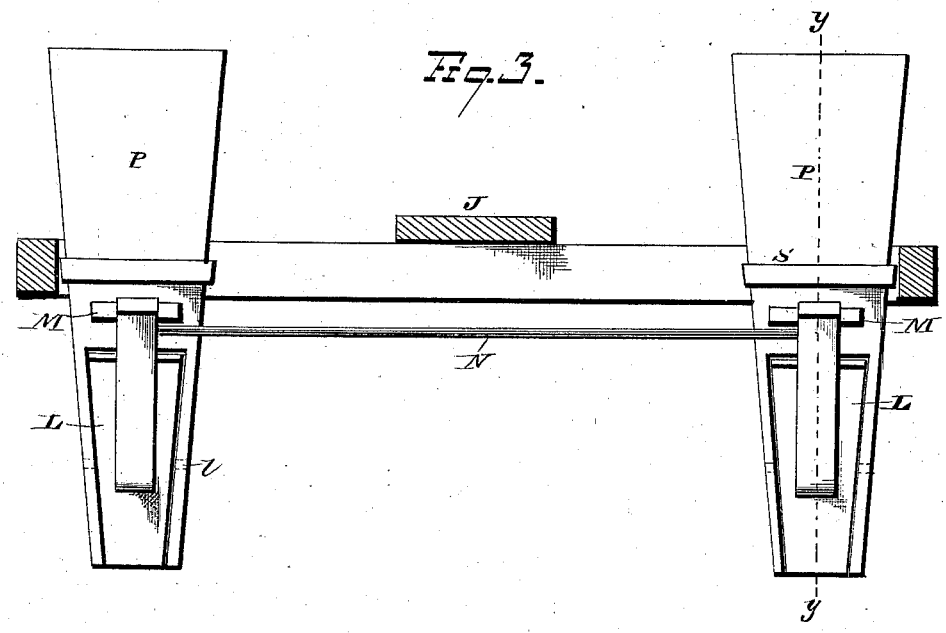
WITNESSES
E. J. Nottingham
A. W. Bright
INVENTOR
Chas. E. Beckwith
By H. A. Seymour
ATTORNEY 3 Sheets—Sheet 3.
C. E. BECKWITH.
Corn-Planter.
No. 217,046.  Patented July 1, 1879.
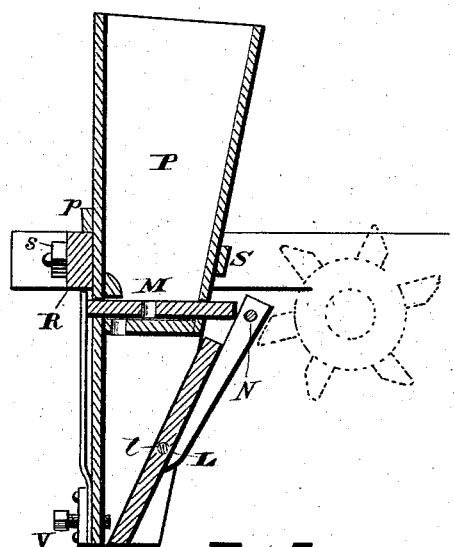
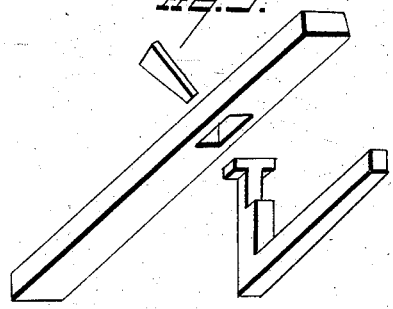
WITNESSES
E. J. Nottingham
A. W. Bright
INVENTOR
Charles E. Beckwith
By H. A. Seymour
ATTORNEY

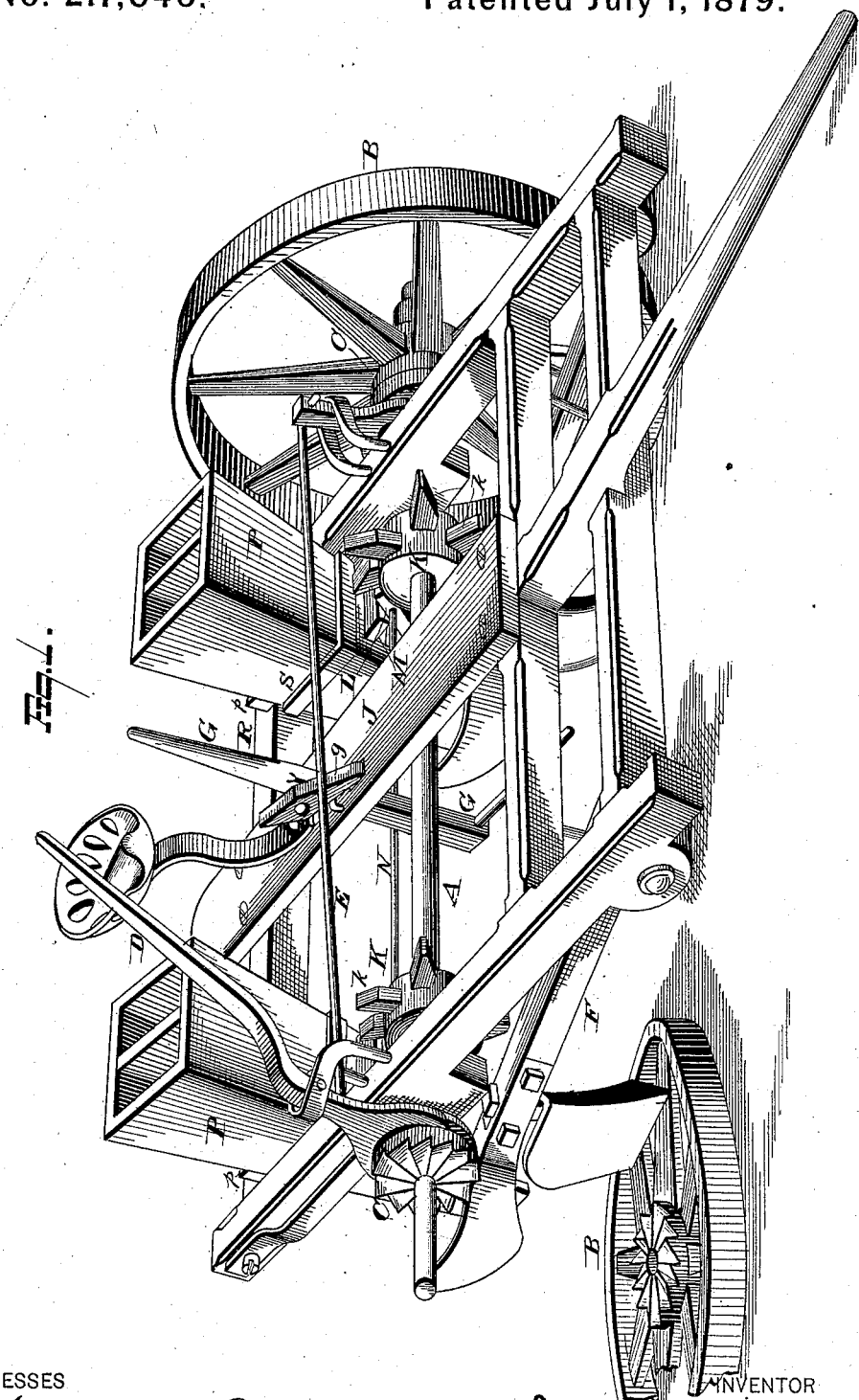

UNITED STATES PATENT OFFICE.

CHARLES E. BECKWITH, OF NORWALK, OHIO, ASSIGNOR TO GEORGE BUTT AND ELLIS L. MUNDY, OF SAME PLACE, ONE-THIRD TO EACH.

IMPROVEMENT IN CORN-PLANTERS.

Specification forming part of Letters Patent No. 217,046, dated July 1, 1879; application filed March 11, 1879.

*To all whom it may concern:*

Be it known that I, CHARLES E. BECKWITH, of Norwalk, in the county of Huron and State of Ohio, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to a combined cornplanter, cultivator, and drill, the object and design of the same being to provide an improved mechanism for planting corn in rows each way at any desired distance apart, or for rowing one way and drilling the other way without requiring the ground to be previously marked in either case, said planter being adapted to be used as a cultivator when the corn is sufficiently grown for such operation by removing the seed-boxes, and also adapted to plant two or more kinds of seed at the same time or separately, as desired, the machine being further adapted to be operated so that the planting or drilling may be accomplished either by hand or automatically at the will of the single operator upon any surface of ground.

The improved construction which attains the above general results constitutes my invention; and the same consists, first, in the combination, with a seed-valve and an axle-cam, of a dropping-lever, whose upper extremity is located between the two, said lever being adapted to be directly engaged with said cam to simultaneously open the valve and final discharge; second, in the combination, with a dropping-lever which has vertically-tilting movement, and whose upper extremity is interposed directly between a grain-valve and an axle-cam, of a horizontal adjusting-screw secured to the rear side of the grain-conductor, and having end bearing against the lower extremity of said dropping-lever, whereby the latter is maintained open while the machine is drilling; third, in the combination, with an axle-cam and a dropping-lever which directly engages therewith, of a duplicate dropping-lever at the opposite end of the machine and a cross-rod which connects the upper extremities of the levers together, said cross-rod being free from engagement with the machine-frame, and having bodily movement in a line transverse to its length.

Referring to the drawings, Figure 1 is a view, in perspective, of a machine embodying the invention. Fig. 2 is a longitudinal central section of the same. Fig. 3 is a transverse sectional view, showing the corn-boxes in front elevation. Fig. 4 is a detail view through line *y y* of Fig. 3. Fig. 5 is a detail view illustrating beam with extra attachment when the machine is used as a cultivator.

The axle A is thrown in and out of rotating gear with the driving-wheels B by means of any suitable clutch mechanism for this purpose. That form of device preferred is ratchet-disks C, operated by a hand-lever, D, located at the right side of the machine, and a horizontal rod, E, connecting the two loose ratchet-disks.

The swinging cultivator-frame F, having its forward portion horizontally pivoted to the corresponding portion of the machine, is adapted to have its free rear portion raised or lowered by means of a bell-crank, G, whose lower extremity engages with a cross-bar, H, of this cultivator-frame.

A fastening-catch, *g*, engages with a recess in the central longitudinal bar, J, and locks the lever, so as to maintain said frame in a raised position. Cam-wheels K, provided with wipers *k*, formed, respectively, thereon at suitable intervals, are secured to opposite extremities of the axle, and are driven thereby in their actuation of the dropping-levers L. Each of these latter levers is made in form to constitute the lower portion of the forward side of its seed-box, and is secured to the latter by a horizontal pivot, *l*, passing through its approximate central transverse portion. Each lever is, therefore, capable of a longitudinal tilting movement, and its lower extremity governs the discharge of the seed from its box by reason of the vertically-inclined position of the same, said lower extremity filling up the space or passage in the discharge end of the box, so that when the same is fitted therein in the normal condition of the several operative parts the seed is prevented from discharge;

but when said lower extremity is thrown out from said position, by reason of its upper extremity being moved inward as it is engaged with the axle-cam, then the discharge is opened and the seed may be duly dropped as usual in planting. The horizontal spring-pressed seed-slide M is, in such instance, simultaneously operated so as to carry seed from the hopper portion of the box to said discharge portion; and with this end in view the upper extremity of the lever is located between the corresponding axle-cam and seed-slide. A horizontal rod, N, extends transversely across the machine, and connects together the upper extremities of the two seed-slides.

In order to convert the machine from a planter to a cultivator, the seed-boxes P are each formed with a horizontal projection, $p$, secured to their back portion, and adapted to have vertical bearing upon the rear transverse frame, R. An angular metallic strap, S, embraces said box, and detachably clamps it in position by nuts $s$, which engage with the screw-threaded ends of said strap as the same project through suitable holes $s'$ formed in said transverse frame.

In cultivating, the seed-boxes are removed and each cultivator-beam F is provided with an extra cultivator-tooth, so that there may be two teeth or plows to each beam. This extra attachment and manner of connecting same will be understood from the detail view of parts shown in Fig. 5 of the drawings.

In order to adapt the machine for use as a drill, a set-screw or equivalent adjustable device, V, is employed to engage with the lower extremity of each dropping-lever, said device being capable, when set in desired adjustment, to maintain the lower extremity of said lever out from the passage-way of the seed in the lower portion of the seed-box, and thereby hold the discharge of the latter constantly open, so that the corn may drop from the center of the box to the ground.

Having fully described my invention, what I claim as new, and desire to secure by Letters Patent, is—

1. The combination, with a seed-valve and an axle-cam, of a dropping-lever whose upper extremity is located between the two, said lever being adapted to be directly engaged with said cam to simultaneously open the valve and final discharge, substantially as set forth.

2. The combination, with an axle-cam, a horizontal reciprocating seed-valve, and a spring to close the latter, of a dropping-lever whose upper extremity directly engages with said valve in opening the same, substantially as set forth.

3. The combination, with the dropping-lever, which has vertically-tilting movement, and whose upper extremity is interposed directly between the grain-valve and the axle-cam, of the horizontal adjusting-screw secured to the rear side of the grain-conductor, and having end bearing against the lower extremity of said dropping-lever whereby the latter is maintained open while the machine is drilling, substantially as set forth.

4. The combination, with the axle-cam and the dropping-lever which directly engages therewith, of the duplicate dropping-lever at the opposite end of the machine and the cross-rod which connects the upper extremities of the levers together, said cross-rod being free from engagement with the machine-frame, and having bodily movement in a line transverse to its length, substantially as set forth.

In testimony that I claim the foregoing I have hereunto set my hand this 3d day of March, 1879.

CHARLES E. BECKWITH.

Attest:
LOUIS D. STRUTTON,
HENRY KARCHER.